April 21, 1942. C. E. BERRY 2,280,619
METHOD AND APPARATUS FOR EFFECTING PARTICLE SIZE REDUCTION
Filed Nov. 26, 1938 4 Sheets-Sheet 1

CHARLES E. BERRY INVENTOR.

BY John P. Hancock

ATTORNEY.

April 21, 1942.　　　C. E. BERRY　　　2,280,619
METHOD AND APPARATUS FOR EFFECTING PARTICLE SIZE REDUCTION
Filed Nov. 26, 1938　　　4 Sheets-Sheet 2

CHARLES E. BERRY INVENTOR.

BY John P. Hancock

ATTORNEY

April 21, 1942.  C. E. BERRY  2,280,619
METHOD AND APPARATUS FOR EFFECTING PARTICLE SIZE REDUCTION
Filed Nov. 26, 1938 4 Sheets-Sheet 3

CHARLES E. BERRY INVENTOR.
BY John P. Hancock
ATTORNEY.

CHARLES E. BERRY INVENTOR.

BY *John P. Hancock*

ATTORNEY

Patented Apr. 21, 1942

2,280,619

UNITED STATES PATENT OFFICE 2,280,619

METHOD AND APPARATUS FOR EFFECTING PARTICLE SIZE REDUCTION

Charles Edward Berry, Wilmington, Del., assignor to E. I. du Pont de Nemours & Company, Wilmington, Del., a corporation of Delaware Application November 26, 1938, Serial No. 242,461

8 Claims. (Cl. 83—11)

This invention relates to a method and apparatus for treating finely-divided substances, and more particularly to the treatment of more or less powdered or pulverulent materials. In a more restricted sense, the invention has reference to the treatment of pigment or dyestuff-useful substances in order to improve their properties and impart to the same certain requisite pigmentary characteristics. More specifically, it relates to the production of pigment-useful materials having such improved fineness and texture characteristics as to be adapted for ready and direct incorporation and use in coating compositions, such as enamels and flat or eggshell types of paints, through the medium of simple mixing and without the necessity of resort to grinding, as previously required.

White or colored pigments adapted for commercial use in paints or other coating compositions must exhibit certain values in respect to fineness and texture and possess satisfactory color, hiding power, opacity, tinting strength and oil absorption properties. The precipitating or other prevailing conditions during normal pigment processing exert a pronounced influence upon these pigment characteristics, and especially upon pigment oil absorption, texture and fineness values. So greatly may such conditions affect these properties, that the pigment product may become wholly unsuited for an intended or particular use, and especially in paint or enamel applications, wherein smooth, unbroken, glossy films are an essential requisite. For example, during the manufacture of such prime white pigments as zinc sulfide, titanium oxide, etc., aggregates or fine particles form during pigment precipitation. These cement together through compacting or sintering during subsequent drying or calcination, manifesting themselves as coarse, hard, gritty particles in the final product. When wet ground to reduce their particle size, and extended with calcium or barium sulfate, both the pigment and extender are usually mixed while in aqueous slurry, following which the mixture is filtered, and the pigment then dried and calcined. Because of the unavoidable presence of small amounts of water-soluble salts in the pigment which act as fritting agents, the pigment particles cement together during calcination, and hard, gritty aggregates become thereby developed in the final or finished pigment. Subsequent disintegration of the lumps which form during such calcination does not effect desired removal or reduction of such aggregates. The presence of these particles or aggregates in the finished pigment is very objectionable because deleteriously inhibiting the obtainment of desired smooth, unbroken, glossy films from well-known coating formulations and procedures, and particularly from enamels and high gloss finishes in which the pigment may be subsequently incorporated.

To reduce the amount of gritty particles present in final pigment products, various processes for wet and dry milling pigments have been proposed, as have various types of grinding or milling media for the purpose. These, however, entail prolonged, tedious and time-consuming operations, which, aside from being economically unattractive, are especially deficient and ineffective for producing a pigment completely and satisfactorily suitable for direct mix-in or use in coating composition formulations without further grinding in a paint grinding mill. Thus, an improved type of pigment milling process comprises a continuous wet grinding and hydroseparating system, wherein the calcined pigment, upon subjection to grinding for several hours in a ball or pebble mill, is dispersed in aqueous media. Removal of the pigment fines from the coarser particles is then effected by hydroseparation, such coarser particles being recycled for further grinding. The fines-containing overflow fraction is coagulated, filtered and then dried. During such filtration and coagulation, aggregates form in the pigment and cement to hard agglomerates during subsequent drying, thereby largely offsetting the benefits of the previous wet grinding. When calcium sulfate-extended pigments are processed, wet milling cannot be resorted to because prolonged contact of such extender with water induces undesirable hydration thereof and consequent formation of coarse acicular gypsum particles in the pigment. Such hydration increases the particle size of the pigment and takes place so rapidly that the whole effect of the previous grinding is dissipated. Dry milling or pulverizing must be resorted to in such instances, as well as after pigment drying following hydroseparation. This is usually effected in such types of disintegrating media as rotary hammer mills, squirrel cage disintegrators, etc., or in pulverizers such as the ring roll, edge runner, or pebble mill type.

Although such dry grinding operations produce a pigment product which may be employed to a limited extent in certain trade applications, they fail to effect the desired and complete removal or reduction of objectionable grit and aggregate particles present in the pigment, and are therefore unsuitable for producing a pigment having such uniformity of particle size, texture and fineness as to be readily useful for direct incorporation and without further grinding in all types of coating compositions. Thus, the texture and particle size characteristics of pigments processed in accordance with such prior methods will be found to be such as to render said pigments especially unadapted for ready and direct use in enamels, in flat and eggshell types of paints, or in water compositions such as casein paints, unless a time-consuming paint grinding period is first resorted to for the purpose of incorporating the pigment in the paint vehicle, to reduce its particle size and produce a paint of satisfactory texture. Although to a slight degree, pulverizing processes are somewhat more effective, one never attains complete and desired removal of aggregates. Furthermore, such methods have the additional disadvantage of affecting the pigment oil absorption characteristics to a deleterious extent, with the result that objectionable loss in pigment hiding power is had. Accordingly, pigments so treated cannot be directly employed in flat paint formulations.

I have found that these as well as other disadvantages in prior methods for effecting particle size reduction of finely-divided materials, and particularly pigments and dyestuff-useful substances, can be easily and effectively overcome. It is accordingly among the objects of my invention to provide a novel method and improved type of apparatus for effecting such result. A particular and special object includes the provision of an improved method and means for treating pigment-like substances to improve their pigmentary properties, especially fineness and texture, as well as impart to the same certain other desired pigmentary characteristics. Further, specific objects include: the production of pigment-useful materials, such as prime white pigments, having such superior texture and fineness characteristics as to be readily adapted for direct use in all types of coating compositions, and especially in enamels, flat or eggshell types of paint, without further grinding in the composition vehicle; the provision of a novel method and means for reducing the particle size of pigment materials without attendant deleterious effects upon the pigment properties of such materials, such as oil absorption, etc.; the production of previously calcined prime white pigments, containing titanium oxide or zinc sulfide or mixtures of such pigments with well-known extenders such as barium sulfate, calcium sulfate, etc., of such fineness and texture that paint films produced therefrom will be inherently superior as respects such fineness or texture characteristics over those obtainable through the employment of commercially available pigments; the production of white pigments, and especially calcium sulfate-containing titanium oxide pigments, of such superior texture characteristics as to be generally acceptable to the trade for the manufacture of enamel types of paints and high gloss finishes; the production of white pigments containing titanium oxide or zinc sulfide, and more particularly calcium sulfate-containing titanium oxide pigments, of such fineness that they can be mixed with paint vehicles to produce enamel paints without necessity of resort to the paint grinding step, as is required when pigments now commercially available are employed; and the production of white pigments, and particularly calcium sulfate-containing titanium oxide pigments, of such fineness as to be readily adapted for direct mix-in with paint vehicles to produce flat and eggshell types of paints, without resort to the paint grinding step necessary when pigments previously available are employed. Other and further objects of my invention will be apparent from the ensuing description and accompanying drawings, wherein Fig. 1 is an elevational view, partly in section, of one particular and preferred type of apparatus useful for adapting my invention;

Figure 1:
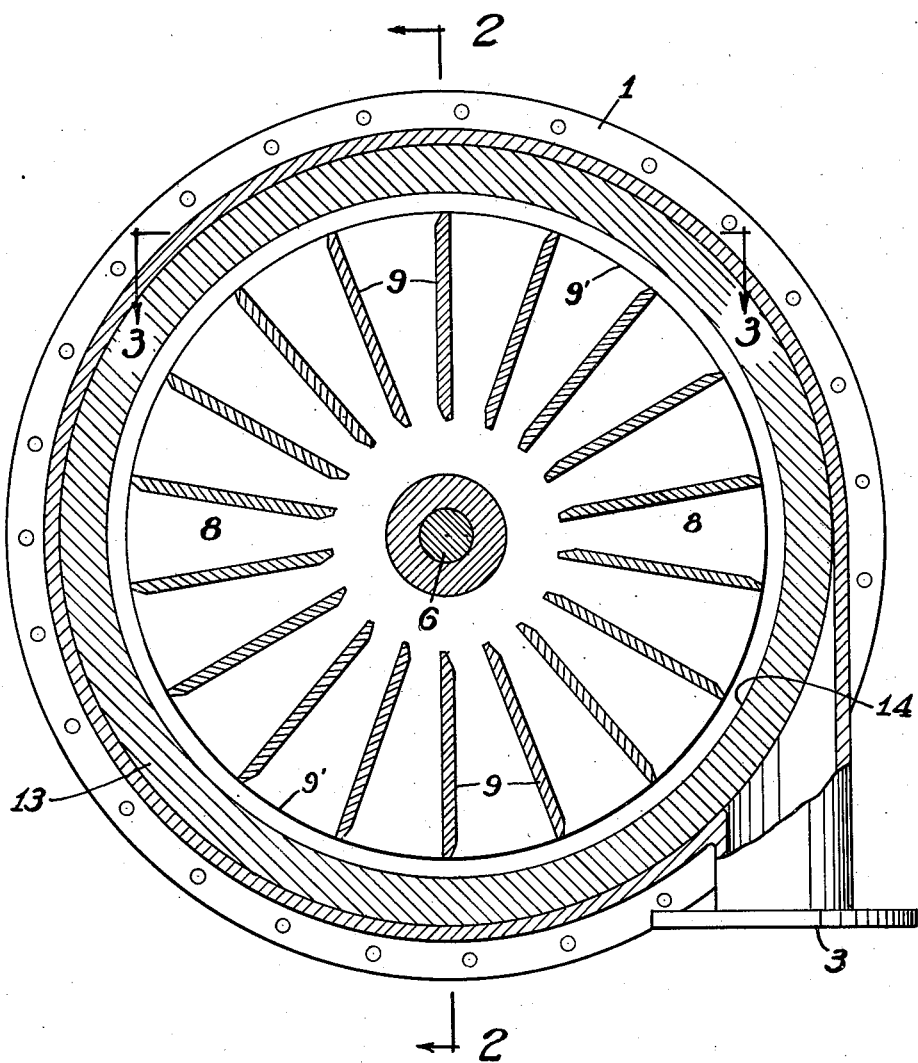
Figures 2, 3:
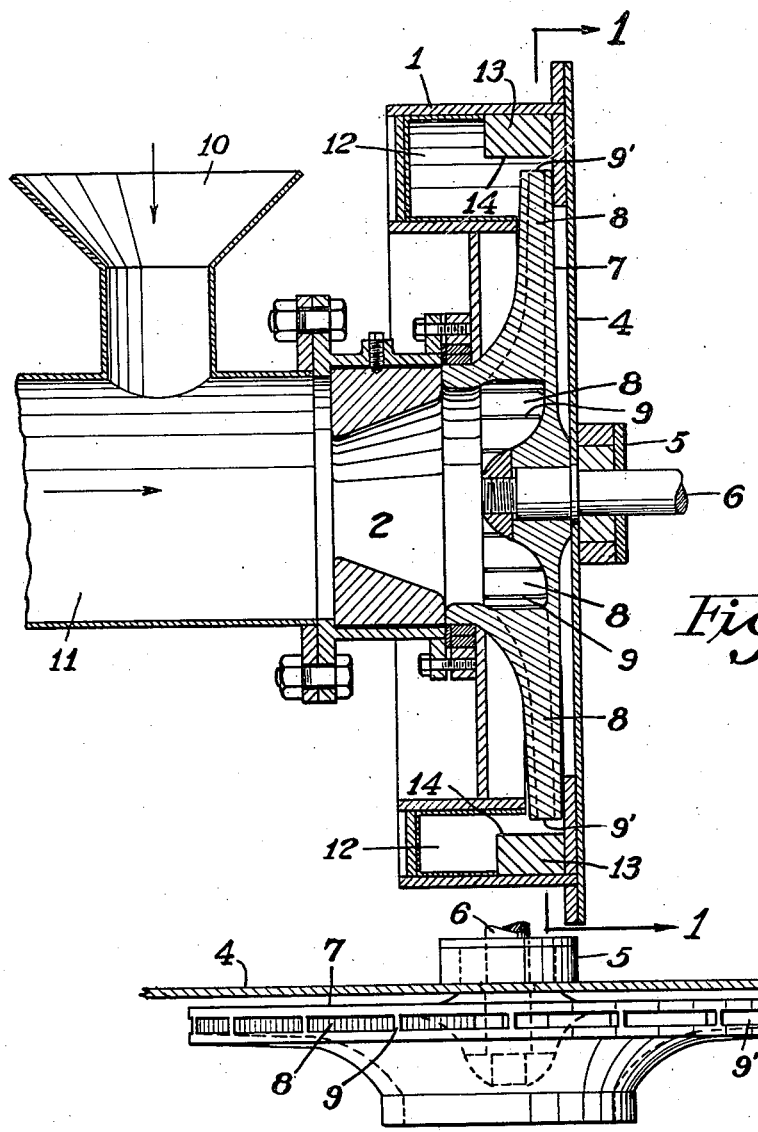
Fig. 2 is a vertical sectional view of the same apparatus taken on a line 2—2 of Fig. 1.
Fig. 3 is a sectional view taken on a line 3—3 of Fig. 1 and in illustration of an end view of a type of rotor element employable in the invention.
Figure 4:
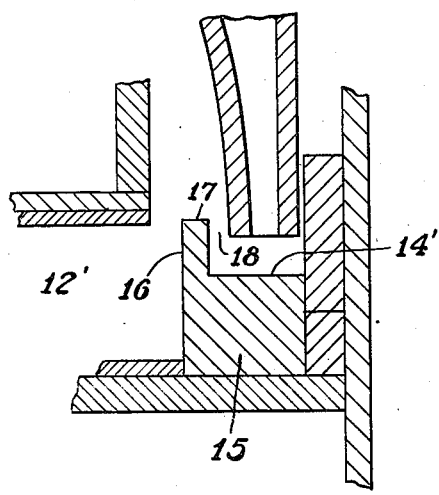
Figure 5:
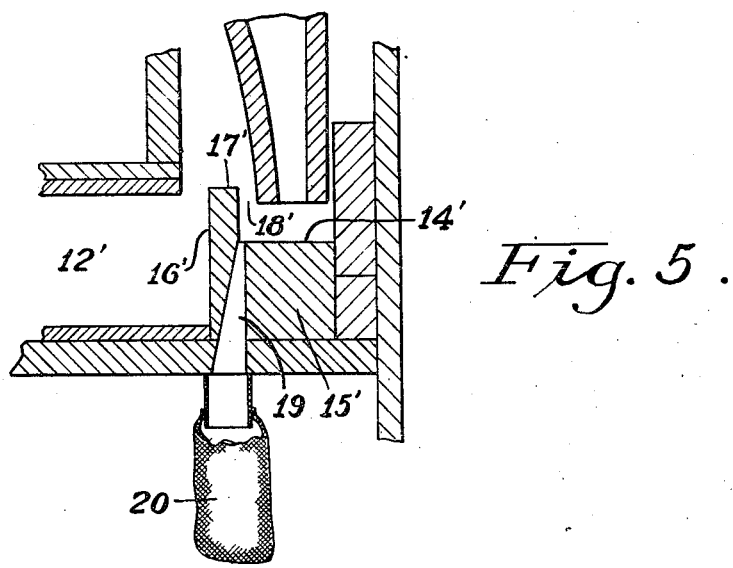
Figure 6:
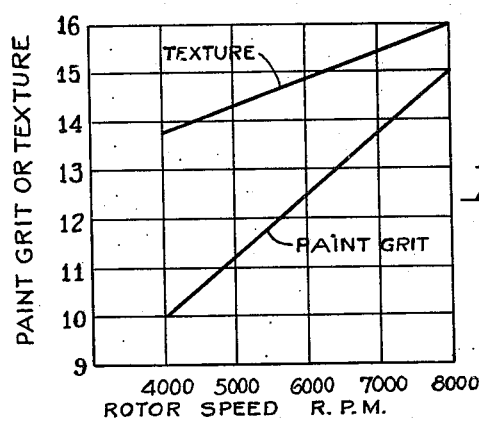
Figure 7:
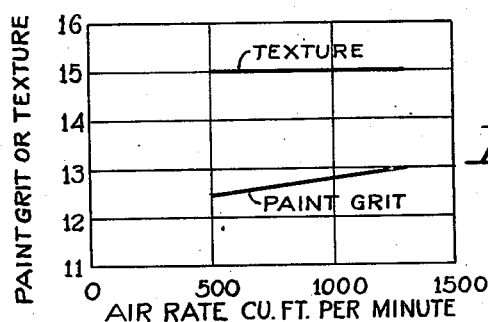
Figure 8:
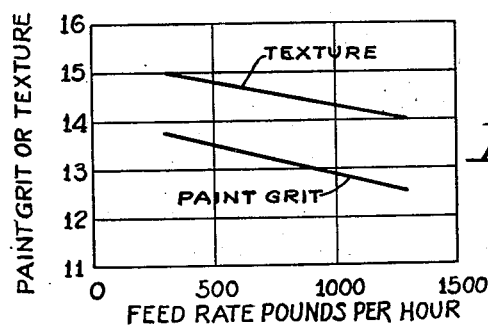

Figs. 4 and 5 comprise segmental, sectional views, in modification of the apparatus shown in Figs. 1 and 2, and particularly illustrate modified forms of impact elements and discharge outlets employable in said apparatus; while Figs. 6–8, inclusive, comprise a series of curves adapted to illustrate the effect which rotor speed, feed and air rate have upon the paint grit or texture characteristics of the product under treatment, the horizontal axes of said figures illustrating rotor speeds in R. P. M., air rate in cubic feet per minute, feed rate in pounds per hour, while the divisions of the vertical axes illustrate the texture and grit determinations which arise as a result of variation in said rotor speed, air and feed rates.

In one broad adaptation, my invention comprises subjecting finely-divided, pulverulent materials, such as pigments or dyestuff-useful substances, while suspended or entrained in a fluid medium, to the action of an enclosed rotor or impeller element operating at controlled but relatively high rates of speed, violently discharging said materials from said rotor by centrifugal force and onto an impact or impinging surface associatedly disposed in relatively close proximity to the peripheral extremities of said rotor or impeller element, and thereafter collecting the resultant materials in reduced particle size.

In one specific and preferred adaptation of the invention there is effected passage of pigment-useful materials, particularly such prime white pigment substances as calcined titanium oxide, zinc sulfide, etc., alone or extended, and while suspended or entrained in air, internally of an enclosed rotor element operating at controlled and relatively high rates of speed, whereby such substances become subjected to the attritive influences of said high speed rotor, as well as of each other, thence violently discharging said materials from said rotor by centrifugal force onto impact or impinging receiving surfaces disposed in close proximity to, but in spaced, constant relationship from the peripheral extremities of said rotor, and then collecting the resultant grit-free, fine texture and reduced uniform particle size product.

For a more complete understanding of my invention, and prior to undertaking a more detailed description thereof, the terms "mix-in pigment particle size," "film count," "oil absorption," "texture" and "paint grit," variously employed herein, will now be defined and methods given for determining such values:

Mix-in pigment particle size test

The term "mix-in pigment particle size," as employed herein and in the appended claims, refers to the size of the discrete particles and aggregates of a dried, finished pigment in a paint composition prepared by simple mixing of pigment and paint vehicle. More particularly, it relates to the number of discrete pigment particles or aggregates of pigment particles in said paint composition which are larger than a predetermined size such as 6 microns, 8 microns or 15 microns.

A convenient method for determining mix-in pigment particle size comprises mixing for 20 minutes 500 grams pigment and approximately 100 grams of a linseed oil vehicle consisting of "Z" body kettle bodied linseed oil of 11 acid number, and petroleum spirits as defined by A. S. T. M. tentative standard D235-26T issued 1926, in the proportion of 52% by weight linseed oil and 48% by weight petroleum spirits, in a pony mixer of the type referred to at page 1283 of Perry's Chemical Engineers' Handbook (1934) and more particularly described as pony mixer 23G of the Kent Machine Works. Said mixer is provided with a receptacle or pot 7 inches in diameter and 5 inches deep rotating at the rate of 60 revolutions per minute, the paddles of said pony mixer rotating in the reverse direction at the rate of 64 revolutions per minute. The actual weight of linseed oil vehicle employed varies with the nature of the pigment being tested; the linseed oil vehicle is added to the 500 grams pigment in just sufficient amount that the paste obtained at the end of 20 minutes mixing in the aforementioned pony mixer gives a penetrometer reading of 25 millimeters with 150 gram load, when tested according to the procedure outlined on pages 596–597 of the 8th (January 1937) edition of "Physical and Chemical Examination of Paints, Varnishes, Lacquers and Colors," by Henry A. Gardner, and employing the cone type penetrometer specified for A. S. T. M. tentative standard D217-27T, described on pages 930–35 of the "Proceedings of the American Society for Testing Materials," vol. 27, part I (1927). The sides and paddles of the pony mixer are scraped down at the end of 1 minute of mixing time and again at the end of the 20 minute mixing period. An additional quantity of the aforementioned linseed oil vehicle is then added to the paste in amount sufficient to provide 250 grams of said vehicle in the paste, the mixture is stirred for an additional minute in the pony mixer, and then is removed from said mixer. A sample of the resultant pigment-linseed oil vehicle paste is diluted to a concentration of 1.163 cubic centimeters pigment per liter thinned paint by stirring with an additional amount of the hereinbefore described linseed oil vehicle. In the case of lithopone this corresponds to the provision of a thinned paint comprising 5 grams pigment per liter. A sample of the thinned paint so obtained is placed in a 100 micron deep glass cell and examined at 500 diameters magnification using transmitted light from a carbon arc. A pigment which by this test shows less than 100 particles per 0.00025 cubic centimeter of thinned paint that are larger than $n$ microns in diameter and not more than 1 particle that is larger than $n+5$ microns in diameter is defined as having a mix-in pigment particle size of $n$ microns. A lithopone, for example, meeting these requirements will contain less than 100 particles larger than $n$ microns in diameter and not more than 1 particle larger than $n+5$ microns in diameter, in $12.5 \times 10^{-7}$ grams pigment, which appear as particles of the abovementioned sizes in a paint prepared by simple mixing of pigment and vehicle.

Film particle count test

The term "film particle count," as employed herein and in the appended claims, refers to the number of particles and aggregates of a dried finished pigment which appear as objectionable grit in a dried film of a paint composition prepared by simple mixing of pigment and paint vehicle. More particularly, it relates to the number of projections above the surface of said film having diameters of 50 microns or more.

A suitable method for determining film particle count comprises mixing 500 grams pigment and sufficient of a vehicle consisting of 75% by weight "Z" body kettle bodied linseed oil of 11 acid number, and 25% by weight petroleum spirits as defined by A. S. T. M. tentative standard D235-26T issued 1926, to provide a p'gment-vehicle mixture comprising 35.7% pigment by volume to 64.3% vehicle by volume, for 20 minutes in a pony mixer, such as set forth at page 1283 of Perry's 1934 Chemical Engineers' Handbook, and provided with a receptacle or pot 7 inches in diameter and 5 inches deep, adapted to rotate at the rate of 60 revolutions per minute and the paddles of which pony mixer rotate at the rate of 64 revolutions per minute in the reverse direction. The sides and paddles of the pony mixer are scraped down at the end of 1 minute of mixing time and again at the end of the 20 minute mixing period. The thick pigment-vehicle mixture thereby produced is passed once through a three-roll paint roller mill having rolls 6'' in diameter and with 0.003'' clearance between said rolls. The first roll in said mill rotates at a speed of 21 revolutions per minute; the second at 63 revolutions per minute; and the third at 189 revolutions per minute. Passage of said mixture through the paint roller mill set with such wide clearance between the rolls effects little if any grinding of the pigment material, but does insure thorough and reproducible mixing of the pigment and vehicle. A 300 gram sample of the resultant mixed paint is diluted with more of the linseed oil vehicle to provide a paint consisting of 17.6% p'gment by volume and 82.4% linseed oil-mineral spirits vehicle by volume. Mineral spirits are then added with stirring in sufficient amount to produce a paint having a consistency of 5.0N, as determined by the modified Stormer Viscometer test described on pages 1273–77 of Perry's "Chemical Engineer's Handbook" (1934). The resultant paint is allowed to stand 20 hours, after which 0.7% by weight of 6% cobalt naphthenate drier and 1.8% of 24% lead naphthenate drier, on the basis of the vehicle weight, are added with stirring. The thinned paint is strained through a 48 thread per inch x 60 thread per inch cotton paint strainer and spun out on a "Pyralin" slide rotating at 480 R. P. M. The film so produced is allowed to dry in a dust-free atmosphere and is then examined at 20 diameters magnification, under illumination at an angle of 18° 26′ 12″, using a high intensity microscope lamp, and the number of projections, noted per 10 square centimeters of paint film, above the surface of said film having diameters of 50 microns or more, are counted. The numerical figure thereby obtained is defined as "film particle count." It is to be understood that the projections above the surface do not necessarily represent pigment particles or pigment aggregates having diameters of more than 50 microns, but that they are projections comprising pigment particles or pigment aggregates plus dried oil film having a total diameter of 50 microns or more. In most instances the pigment particles or aggregates of themselves will be responsible for little more than half the total diameter of said projections.

Oil absorption

By the term "oil absorption" is meant the amount of oil, in grams, required to wet 100 grams of pigment. By this means a practical test is had for determining pigment uniformity, whereby the consistency of pigments in oil and ready mixed paints may be readily predicted. The oil absorption characteristics of pigments vary, and depending upon the type of pigment and means of manufacture, may be of either high, low, or medium oil absorption value.

A practical method of testing pigments to determine their oil absorption values is that described in "Physical and Chemical Examination of Paints and Varnishes, Lacquers and Colors." by Henry A. Gardner, pp. 540–541, 8th edition, January 1937. Briefly, this is as follows:

A 5 gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

Texture

Texture may be defined as the hardness, shape and size of the individual pigment particles, and directly influences the type of paint or coating composition film which will be obtained when a pigment is employed in a given formulation, i. e., whether the film will be rough or smooth. An efficient test for determining texture and fineness of pigments comprises that outlined in "Physical and Chemical Examination of Paints. Varnishes, Lacquers and Colors," by Henry A. Gardner, 8th edition, pp. 511–512, January 1937. Briefly, this is as follows:

Using a spatula with a flexible blade (1½ by 6½ inches), mix the pigment with a quick drying varnish of fairly good wetting properties The amount of pigment and varnish varies with the nature of the pigment. For titanium dioxide, use about 1.5 grams of pigment and 1.8 cubic centimeters of varnish. Give the paste 50 double rubs, using strokes about 12 inches long. Collect and respread the paste after each 10 rubs. Make a wedge-shaped film on glass by drawing a 3½ inch doctor blade, one end of which is resting on a steel strip 0.003 inch thick, over the paint. Allow the film to dry in a dust-free atmosphere and then examine it under illumination at grazing incidence, using a high intensity microscope lamp. Grading is most conveniently done against standards and is based on the size and number of coarse particles projecting from the thin portion of the wedge film.

The value for texture thus obtained is a measure of the number of particles of the order of 10 microns, and may be defined by means of an arbitrary scale. The standards which I use range from "1" at the bottom of the scale (representing a film containing a large number of 10 micron particles and with a sand-like appearance), to "17" at the top of the scale (representing perfect texture properties and a film having a smooth and glass-like appearance, with practically no perceptible coarse particles). The intermediate standards represent gradual and evenly spaced graduations from one extreme to the other, a difference of one point being material in the scale.

Paint grit

The values for paint grit herein were determined by a convenient and practical test for the semi-quantitative determination of coarse particles, comprising mixing 200 grams of pigment with 106 grams of a quick drying varnish. The resultant paste is passed once through a roll mill with the rolls set 0.0015 inch apart. Steel strips are used for setting the mill and are withdrawn before grinding. The ground paste is reduced to paint consistency by addition of 82 grams of the varnish to 265 grams of the paste and is allowed to stand 16 hours. A uniform film of the paint is made on glass by drawing over the paint a 3½ inch doctor blade, both ends of which are resting on steel strips 0.0015 inch thick. The film is allowed to dry in a dust-free atmosphere and is then examined under illumination at grazing incidence, using a high intensity microscope lamp, and compared for film fineness and for the presence of coarse gritty aggregates against a set of arbitrary standards.

The value for paint grit thus obtained is a measure of the number and size of particles protruding above the surface of the film, and is especially a measure of the quantity of grit particles above a size of 40 microns. The standards used range from "1" at the bottom of the scale (representing a film with extremely coarse particles and sand-like in appearance), to "16" at the top of the scale (representing perfect grit value and a film which is smooth and glass-like in appearance, with practically no perceptible coarse particles). The intermediate standards represent gradual and evenly spaced graduations from one extreme to the other, a difference of one point being material in the scale.

Having defined certain descriptive terminology which I employ for a more complete understanding of my invention, a detailed description of said invention, and particularly in respect to one preferred embodiment thereof, will now be undertaken.

Referring to the drawings, which are merely diagrammatic and in no sense to scale, and particularly to Figs. 1–3 thereof, there is shown an enclosure casing I, provided with an inlet 2 and an outlet 3. Journalled in a casing wall 4 and bearing member 5 is a horizontally-disposed drive member or shaft 6, which is adapted to rotate at any desired, relatively high and controlled rate of speed by means of a source of power and control means (not shown). Keyed, or otherwise fixedly secured to one end of the drive shaft 6 for rotation therewith, is a unitary or sectional rotor or impeller element 7. Said rotor is preferably of substantially disc-like shape and is provided with a plurality of internal apertures or passages 8 which, as shown, progressively increase in area or cross section from substantially the hub center of the rotor to the outer circumference or periphery thereof. As stated, the rotor 7 is either unitary or sectional in construction, the internal passages 8 being integrally or separately formed therein, such as by interpositioning substantially radially extending partition members 9. Preferably, the passages 8 terminate as discharge outlets 9' at the outer periphery of said rotor, and are in open communication with the casing inlet 2 which, as shown, is provided with a throat which progressively increases in cross section in order to facilitate the passage and uniform introduction of material under treatment into said rotor. Casing inlet 2 is also preferably in open communication with a source of material supply, such as hopper 10 or similar means, from which material to be ground is fed to the apparatus while air or otherwise fluid-suspended by reason of the suction set up due to rapid rotation of the rotor or the injection of air or other fluid for effecting such suspension through the medium of the fluid supply means 11.

Also arranged within the casing 1 and preferably within a substantially circular collecting and discharge chamber 12 (which chamber, if desired, may also be in volute or other form), is an anvil or annular impact member 13. Said member is disposed in operative relationship with respect to the rotor 7 and particularly with the outer circumferential or peripheral limits of the latter, being so arranged as to preferably be substantially concentric with discharge outlets 9'. The anvil 13 is provided with receiving or facing surfaces 14 which are preferably relatively flat, but which, if desired, may be relatively concave or convex in form. Also, and as shown, the receiving surfaces 14 are so disposed with respect to the rotor discharge outlets 9' as to be in relatively close proximity thereto and short of substantial contiguous or touching relationship therewith. Said surfaces 14 thereby function to receive material being treated in the apparatus upon its issuance from the outlets 9' and by reason of centrifugal force exerted when said rotor operates at a high speed, said material becoming violently impacted against said surfaces and thus further reduced in particle size. Thus, reduction of the particle size of the materials under treatment is effected due to their subjection to the combined attritive, abrasive, rubbing, pressing and grinding action afforded not only by reason of direct contact of said particles against the surfaces of the working parts of the high speed rotor, but also against each other, with a final crushing due to violent impingement against the receiving surfaces 14. After subjection to the combined attritive and grinding actions thus afforded, the reduced, uniform size particles issue from the receiving surfaces 14 into the surrounding collecting zone 12, which, as shown, progressively enlarges in cross sectional area to casing outlet 3, from which treated, reduced material is removed to storage or a point of use.

In one operation of a device such as described, the drive shaft 6 is powered to rotate at a relatively high but controlled rate of speed, depending upon the material being acted upon and the texture and fineness characteristics desired to be developed in the finished product. Practically, and for most purposes, in effecting substantial and desired improvements in the fineness and texture of pigments or dyestuff-useful materials, I resort to rotor peripheral speed rates of at least about 5,000 feet per minute, and preferably in excess of about 10,000 or 20,000 feet per minute. Rapid, high speed movement of the rotor 7 causes a suction to be set up within the apparatus, thus functioning to draw air-entrained or otherwise fluid-suspended material into said apparatus for treatment from the supply hopper 10, through casing inlet 1, its enlarged throat, and into and through the center of said rotor. From the center of the rotor the material under treatment passes into and through internal passages 8 of said rotor, to centrifugally and violently discharge from the rotor, through outlets 9', onto the closely associated material receiving surfaces 14 of stationary impact element 13, as shown. By reason of the regulated and relatively constant rotor speeds thus maintained and subjection of such material to the highly attritive, grinding and abrading action of the operating parts of the rotor, its associated elements, the outer surfaces of the internal passages 8 and final impingement due to centrifugal discharge onto the receiving surfaces 14 of the anvil member 13, the particle size of the fluid or air-entrained material becomes substantially and surprisingly uniformly reduced to a fine state of comminution. After final disintegration, the reduced materials issue from the anvil receiving surfaces, pass into collecting chamber 12, which is in open communication with casing outlet 3, from whence they pass in finished, ground condition to storage or a point of use. As indicated, the collecting zone 12 is of progressively increasing cross section to the point of casing outlet 3. This is in order to maintain and insure relatively constant and equalized material and fluid flows through the apparatus, commensurate with utilized rotor speeds and fluid and material feed rates in any given operation.

To indicate more clearly the relationship which the factors of rotor peripheral speeds, material and fluid feed rates, weight of material per unit volume of gaseous fluid employed, and clearances between anvil receiving surfaces and rotor periphery bear to the texture, grit and oil absorption values which a pigment comminuted and dry ground in accordance with my invention will exhibit, and, further, to comparatively illustrate such values with the results which accrue when the same type of pigment is subjected to conventional grinding procedures, the following illustrative examples are given:

Example I

One portion of a calcined but unground titanium dioxide-extended pigment (containing 30% $TiO_2$ and 70% $CaSO_4$) was supplied while suspended in an air stream to a dry milling apparatus such as the improved type described. The rotor diameter of such device was approximately 21½", while the impinging or material-receiving surfaces of its concentric impact element were maintained at a constant distance of ½" from the rotor discharge outlets. Previous to treatment, the pigment had a paint grit and texture value of 1 and an oil absorption value of 21. The remaining portions of the pigment were subjected to conventional milling in prior dry milling types of apparatus, particularly to disintegration in a 24" rotary hammer mill and pulverization in a 50" ring-roll mill equipped with an air separator. The conditions prevailing and the comparative results obtained in each instance of pigment treatment were as follows:

| Speed | | Air rate | Feed rate | Paint grit | Texture | Oil absorption |
|---|---|---|---|---|---|---|
| Rotation | Peripheral | | | | | |
| R. P. M. | Ft./min. | Cu. ft./min. | Lbs./hr. | | | |
| 8,000 | 45,000 | 500 | 291 | 15 | 14.5 | 20 |
| 8,000 | 45,000 | 500 | 632 | 12 | 14 | 20 |
| 8,000 | 45,000 | 900 | 600 | 12 | 14.5 | 20 |
| 7,000 | 39,400 | 500 | 545 | 10 | 12.5 | 20 |
| 7,000 | 39,400 | 1,300 | 546 | 12 | 14 | 20 |
| Pigment not milled | | | | 1 | 1 | 21 |
| Pigment disintegrated by passage at 2,300 lbs./hr. rate through 24-inch rotary hammer mill | | | | 2 | 9 | 19 |
| Pigment pulverized by passage at 2,300 lb./hr. rate through 50-inch ring roll mill equipped with air separator | | | | 4 | 9 | 12 |

*Example II*

Similarly, a calcined titanium dioxide pigment, previously wet milled in accordance with the process of U. S. Patent 1,937,037 and then coagulated and dried, was divided into a plurality of parts, one part being supplied at various rates to the same type of milling device as employed in Example I hereof, other portions being dry milled in commonly employed prior art milling equipment, as shown below. The conditions prevailing and results obtained in each instance are as follows:

| Speed | | Air rate | Feed rate | Paint grit | Texture | Oil absorption |
|---|---|---|---|---|---|---|
| Rotation | Peripheral | | | | | |
| R. P. M. | Ft./min. | Cu. ft./min. | Lbs./hr. | | | |
| 8,000 | 45,000 | 500 | 523 | 14.5 | 16.5 | 22.0 |
| 8,000 | 45,000 | 500 | 925 | 14 | 16 | 22.0 |
| 8,000 | 45,000 | 500 | 1,500 | 13 | 16 | 22.5 |
| Pigment not dry milled | | | | 2 | 2 | 23.8 |
| Pigment disintegrated by passage at 2,300 lb./hr. rate through 24-inch rotary hammer mill | | | | 8 | 11 | 23 |
| Pigment pulverized by passage at 2,300 lb./hr. rate through 50-inch ring roll mill equipped with air separator | | | | 6 | 10 | 18 |

*Example III*

Similarly, a calcined, barium sulfate-extended lithopone pigment, previously wet milled in accordance with the process of U. S. Patent 1,826,131 and then coagulated and dried, was divided into a plurality of parts, one part being supplied at various rates to the same type of milling device as employed in Example I hereof, other portions being dry milled in commonly employed prior art milling equipment, as shown below. The conditions prevailing and results obtained in each instance are as follows:

| Speed | | Air rate | Feed rate | Paint grit | Texture | Oil absorption |
|---|---|---|---|---|---|---|
| Rotation | Peripheral | | | | | |
| R. P. M. | Ft./min. | Cu. ft./min. | Lbs./hr. | | | |
| 8,000 | 45,000 | 500 | 523 | 15.5 | 16.5 | 13 |
| 8,000 | 45,000 | 500 | 925 | 15 | 16 | 13 |
| 8,000 | 45,000 | 500 | 1,500 | 14 | 16 | 13.5 |
| Pigment not dry milled | | | | 3 | 3 | 13.7 |
| Pigment disintegrated by passage at 2,300 lb./hr. rate through 24-inch rotary hammer mill | | | | 12 | 14 | 13.2 |

*Example IV*

Similarly, a grade of titanium oxide characterized by low water absorption and excellent dispersion characteristics in water, was dry milled in a 50" ring roll mill equipped with an air separator, at a rate of 2300 lbs./hr. The resultant product was undesirably low in oil absorption value (about 19) and contained about 5% of grit coarser than 325 mesh—the grit determination being measured by a test in which 3 grams of pigment is agitated vigorously with 300 cc. of distilled water for one minute, poured on a 325 mesh sieve, washed with a very light stream of water and the grit dried and weighed. A sample of the same unground calcined titanium dioxide pigment was supplied to the same milling device described in Example I, at the rate of 1500 lbs./hr. in a 900 cu. ft./ min. air stream, the rotor operating at a speed of 7750 R. P. M. In contrast to the 3% content of coarse grit and 19 oil absorption value for this pigment, when treated in the ring roll mill, the pigment, when treated in accordance with my invention, was found to be desirably high in oil absorption, exhibiting a value therefor of 23.4, and contained but 0.05% of grit, when measured by the same 325 mesh water grit test. Additionally, it had satisfactory low water absorption properties and excellent dispersion characteristics in water.

Example V

A previously calcined, ring rolled, extended titanium dioxide pigment of approximately 30% $TiO_2$ and 70% $CaSO_4$ composition, determined to have a paint grit value of 5, a texture value of 8, and an oil absorption value of 12, after such prior art ring rolling, was variously subjected to dry milling in the same apparatus of my invention shown in the preceding examples, in order to determine the effect which rotor speed has upon product fineness and various conditions of feed and air rate. The pigment material was charged into the apparatus at a nominal air rate of 500 C. F. M. and a nominal feed rate of 950 lbs./hr., the peripheral speeds of the rotor, however, being varied. The conditions prevailing in each instance of test and the results obtained are as follows:

Nominal air rate of 500 cu. ft./ min. and feed rate of 950 lbs./hr.:

| | Speed | | Air rate | Feed rate | Paint grit | Texture | Oil absorption |
|---|---|---|---|---|---|---|---|
| | Rotation | Peripheral | | | | | |
| | R. P. M. | Ft./min. | Cu. ft./min. | Lbs./hr. | | | |
| 1 | 8,000 | 45,000 | 500 | 819 | 15 | 16 | 12 |
| 2 | 7,000 | 39,400 | 500 | 1,000 | 12.5 | 15 | 12 |
| 3 | 6,000 | 33,800 | 500 | 1,000 | 11 | 15 | 12 |
| 4 | 5,000 | 28,100 | 500 | 980 | 12 | 14 | 12 |
| 5 | 4,000 | 22,500 | 500 | 1,000 | 10 | 14.5 | 12 |

As a result of the foregoing, it will be evident that with increasing rotor speed the fineness of product becomes improved, as indicated by the increase in the numerical values for paint grit and texture.

Example VI

To determine the effect of air rate through the rotor upon fineness or texture, a ring-rolled, extended $TiO_2$ pigment of the same composition and paint grit, texture and oil absorption values as that of the pigment of Example V was variously charged into the same milling apparatus of said example. A nominal, constant feed rate of 950 lbs./hr., and constant rotor speeds of 7000 R. P. M. were maintained in each instance, the air rate only being varied. The conditions prevailing and the texture, grit and oil absorption values resulting are as follows:

Nominal rotor speed of 7000 R. P. M. and feed rate of 950 lbs./hr.:

| | Speed | | Air rate | Feed rate | Paint grit | Texture | Oil absorption |
|---|---|---|---|---|---|---|---|
| | Rotation | Peripheral | | | | | |
| | R. P. M. | Ft./min. | Cu. ft./min. | Lbs./hr. | | | |
| 1 | 7,000 | 39,400 | 500 | 1,000 | 12.5 | 15 | 12 |
| 2 | 7,000 | 39,400 | 1,000 | 1,000 | 13 | 15 | 12 |
| 3 | 7,000 | 39,400 | 1,300 | 1,000 | 13 | 15 | 12 |

As will be evident from this example, increase in the air rates improves the fineness or texture of the pigment product.

Example VII

To determine the effect of material feed rate through the apparatus upon fineness or texture for various conditions of speed and air rate, a ring-rolled, extended $TiO_2$ pigment of the same composition and paint grit, texture and oil absorption values as that of Example V, was subjected to treatment in the same milling apparatus as that of said example. Nominal, constant speed rates of 7000 and 4000 R. P. M., together with nominal air rates of 500 and 1000 C. F. M., were employed, variance only in the feed rate lbs./hr. being had. The prevailing conditions and the texture, grit and oil absorption values resulting in each instance are enumerated below:

(a) Nominal rotor speed of 7000 R. P. M. and air rate of 500 cu. ft./min.:

| | Speed | | Air rate | Feed rate | Paint grit | Texture | Oil absorption |
|---|---|---|---|---|---|---|---|
| | Rotation | Peripheral | | | | | |
| | R. P. M. | Ft./min. | Cu. ft./min. | Lbs./hr. | | | |
| 1 | 7,000 | 39,400 | 500 | 78 | 12.5 | 16.5 | 12 |
| 2 | 7,000 | 39,400 | 500 | 121 | 13 | 16 | 12 |
| 3 | 7,000 | 39,400 | 500 | 182 | 13 | 15.5 | 12 |
| 4 | 7,000 | 39,400 | 500 | 324 | 13 | 15 | 12 |
| 5 | 7,000 | 39,400 | 500 | 572 | 12 | 14.5 | 12 |
| 6 | 7,000 | 39,400 | 500 | 1,000 | 12.5 | 15 | 12 |

(b) Nominal rotor speed of 7000 R. P. M. and air rate of 1000 cu. ft./min.:

| | Speed | | Air rate | Feed rate | Paint grit | Texture | Oil absorption |
|---|---|---|---|---|---|---|---|
| | Rotation | Peripheral | | | | | |
| | R. P. M. | Ft./min. | Cu. ft./min. | Lbs./hr. | | | |
| 1 | 7,000 | 39,400 | 1,000 | 353 | 13.5 | 15 | 12 |
| 2 | 7,000 | 39,400 | 1,000 | 632 | 13.5 | 14.5 | 12 |
| 3 | 7,000 | 39,400 | 1,000 | 1,000 | 13 | 14.5 | 12 |
| 4 | 7,000 | 39,400 | 1,000 | 1,280 | 12.5 | 14 | 12 |

From this example and as indicated by the decreasing numerical values of the paint grit and texture gradings obtained, it will be found that increasing the feed rate of material through the apparatus tends to decrease the fineness characteristics of the product.

*Example VIII*

To determine the effect which clearances between the discharge outlet of the rotor and the impact anvil receiving surfaces have upon pigment grit, texture and oil absorption values, a previously ring-rolled, TiO₂-extended pigment of the same composition and paint grit, texture and oil absorption values as the pigment of Example V was subjected to treatment in the same milling apparatus as that of said example. Varying rotor outlet-anvil receiving surface clearances were resorted to, while relatively constant rotor peripheral speeds and air and feed rates were maintained. The conditions prevailing and results obtained in each instance of test are as follows:

*Effect of clearance between rotor and anvil*

| Clearance | Speed | | Air rate | Feed rate | Paint grit | Texture | Oil absorption |
|---|---|---|---|---|---|---|---|
| | Rotation | Peripheral | | | | | |
| | R.P.M. | Ft./min. | Cu. ft./min. | Lbs./hr. | | | |
| ¼ in | 4,000 | 22,500 | 500 | 640 | 13.5 | 16 | 11 |
| ½ in | 4,000 | 22,500 | 500 | 632 | 12.5 | 15 | 11 |
| ¾ in | 4,000 | 22,500 | 500 | 600 | 12 | 14.5 | 11 |
| 1 in | 4,000 | 22,500 | 500 | 550 | 11.5 | 14 | 11 |
| 1¼ in | 4,000 | 22,500 | 500 | 500 | 11 | 13 | 11 |
| 1½ in | 4,000 | 22,500 | 500 | 400 | 10.5 | 13 | 11 |
| 2 in | 4,000 | 22,500 | 500 | 350 | 10.5 | 12.5 | 11 |

As will be seen from this example, the values for paint grit and texture increase as the clearances between rotor discharge outlet and anvil receiving surface decrease, and this occurs in spite of the fact that the feeding rate employed in instances where clearances in excess of ½" were utilized favors this particular type of apparatus.

While certain operating conditions have been specified in the foregoing examples as useful in the invention in conjunction with a particular type or design of apparatus described, these are merely illustrative and have been utilized in order to procure optimum benefits. Obviously, the invention is not limited thereto, nor is it limited to the particular form of apparatus exemplified. Generally, in effecting the procurance of advantageous benefits under the invention, I prefer to observe and maintain certain correlated operating criticals when practically adapting the same. Thus, I preferably correlate the rotor peripheral speeds, clearances or spaced relationships between rotor and anvil, and particularly between the rotor periphery and anvil-receiving surfaces, material feed rate and gaseous fluid flow through the apparatus, as well as weight of material per unit volume of gaseous fluid which are employed. These factors or criticals it will be appreciated, are subject to wide variance, largely depend upon the type or design of milling apparatus employed, the type or character of material under treatment, its size and previous history, as well as the fineness or texture characteristics desired to be ultimately developed therein. In any given operation, they are easily determined by experimental trial. In the preferred adaptation of the invention, and in order to procure optimum benefits hereunder, I resort to rotor peripheral speeds ranging from about 20,000 ft./min. to about 60,000 ft./min.; clearances between rotor discharge outlets and anvil receiving surfaces of from about 0.1 inch to about 1 inch; a rate of gaseous fluid flow through the apparatus ranging from about 200 cu. ft./min. to about 2,000 cu. ft./min.; a material feed rate ranging from about 50 to 2000 pounds per hour; and a range of about 0.0004 to about 0.17 pound of material per cubic foot of gaseous fluid utilized. While these or narrower ranges comprise preferred useful limits in the procurance of optimum benefits under my invention, the same is not limited thereto, and accordingly I contemplate utilizing the following plurality of ranges, of which Ranges 2 and 3 constitute preferred embodiments:

| Range | Clearance (inches) | Rotor speed (ft. per min.) | Gas rate (C. F. M.) | Material feed rate (lbs. per hr.) | Mat. in gas density (lbs. material per cu. ft. gas) |
|---|---|---|---|---|---|
| 1 | 0.005" to 5.0" | 5,000 to 70,000 | 50 to 5,000 | 20 to 4,000 | 1.3 max. |
| 2 | 0.1" to 1.0" | 20,000 to 60,000 | 200 to 2,000 | 50 to 2,000 | .0004 to 0.17 |
| 3 | 0.05" to 0.5" (i. e. ½" max.) | 22,500 to 45,000 | 500 to 1,300 | 80 to 1,500 | .001 to 0.05 |

As will be noted, the gradings for paint grit, texture and oil absorption given in the foregoing examples are clearly indicative of the fact that when finely-divided materials, and particularly pigment-useful substances, are treated in accordance with my invention, marked improvements in respect to such pigmentary characteristics will inherently result, and that such benefits and improvements cannot be attained when such pigment materials are treated and comminuted in accordance with prior milling procedures; and further, that such improved results are obtained without affecting other pigmentary properties, such as oil absorption values of the material under treatment, contrary to experiences had when prior grinding procedures are resorted to. Further, and as said examples also demonstrate, when relatively high and increased air rates, rotor peripheral speeds, and close clearances between the rotor outlet discharges and anvil receiving surfaces, are resorted to, the texture and fineness characteristics exhibited by the resultant pigment product become desirably increased and improved; while when resort is had to relatively high and excessive feed rates, the pigment texture becomes undesirably affected. The effects which variation has upon pigment grit or texture when the factors of rotor speed, air and feed rate are varied in a device such as that described in the examples, is to some extent graphically illustrated in the accompanying Figs. 6, 7 and 8 of the drawings. In said figures, the divisions of the vertical axes indicate texture and grit results, whereas the divisions of the horizontal axes give, respectively, the rotor speed in R. P. M., the air rate in C. F. M., and feed rate in pounds per hour. From an inspection of these figures, it will be evident that the fineness of product becomes improved as the rotor speed is increased (Fig. 6); the fineness or paint grit of the product improves as the air rate is increased (Fig. 7); while with increasing feed rate of materials through the apparatus, fineness of product becomes affected.

Not only does treatment of pigment and dyestuff-useful substances in accordance with my invention effect the fineness and texture improvements mentioned and thus impart greater opacity and tinctorial power to the finished product, but further important attributes and properties are caused to be imparted in such substances. Thus, in addition to relatively complete freedom from grit (clearly manifested, not only by reason of reduction to fine, small particle size, but also by reason of the fact the individual particles more nearly approximate uniformity), my improved pigments, as has been indicated, are readily utilizable as direct mix-in pigments. Thus, by simply incorporating or mixing the same in usual coating composition vehicles through aid of a simple paint mixer or amalgamator, a paint or enamel composition results which is adapted to provide a fine texture film upon drying,—and this without recourse to any grinding of the pigment in the vehicle in common pebble or roller mills, as has been previously required. For instance, pigments treated in accordance with my invention may be directly employed in such ordinary paints as those of the flat or wall type. These usually consist of a white or colored pigment base, a thinning medium, such as linseed oil, turpentine spirit, etc., and a little drier. Similarly, and more advantageously, they may be directly employed in more complex gloss or varnish paints, such as in enamels or eggshell types of paints. These consist essentially of an insoluble white or colored pigment base, which, previous to my invention, had been ground to suitable texture in an oil and varnish menstruum and thinned with turpentine substitute to render the same, at either ordinary or baking temperatures, capable of hardening to a more or less smooth, glossy film surface, when applied to a surface desired to be covered or ornamented. These types of finishes are commonly known and understood in the art. In general, classification of a finish to particular type depends upon the percentage of vehicle present therein, the type and character of such vehicle, the percentage by volume of pigment present, and the type and previous history of such pigment. Practically, a flat type of finish usually contains in excess of from about 50 to about 55% pigment material by volume, and presents a dry paint film in which the binder portion does not fill all void spaces between the pigment particles. Although presenting a relatively smooth film surface to the naked eye, it possesses a micro rough surface of relatively low specular reflection. An enamel type of finish comprises one containing less than from about 40 to 45% pigment by volume. It produces a dry paint film in which the binder is sufficient to fill essentially all voids between pigment particles, to present a relatively smooth, glossy film having a micro smooth surface of relatively high specular reflection. An eggshell type of finish contains from about 35 to 50% of pigment by volume, is of smooth intermediate character to a flat or enamel type of finish, and presents a semi-gloss appearance upon drying. Although pigments, when treated in accordance with my invention, will be found to be particularly adaptable for use in the types of finishes mentioned, they are also advantageously useful in other types of coating compositions in which prime white, tinted or colored pigment substances are usually employed. Among such other types may be mentioned the resin or alkyd resin-containing enamels or pyroxylin or nitro-cellulose lacquers. Specific coating composition formulations, as stated, are commonly known in the art and variously appear in the literature. Among specific examples of useful and contemplated types of formulations may be mentioned those appearing in McKinney, et al. U. S. Patent 2,062,137, dated November 24, 1936; The Chemical Formulary (1935), vol. 2, pp. 75–127, published by D. Van Nostrand & Company, Inc.; or in Scott's Formulas and Process for Manufacturing Paints, Oils and Varnishes (1928), pp. 5–30, 211, 215, published by the Trade Review Company of Chicago, etc.

The ready adaptability to direct mix-in which pigment substances treated in accordance with my invention afford will be evident at once upon evaluating and testing such treated substances, in accordance with the mix-in pigment particle size and film particle count tests referred to. As stated, a pigment or dyestuff-useful substance having a mix-in particle size of n microns in accordance with my invention may be defined as one which shows less than 100 particles per 0.00025 cc. of thinned paint that are larger than n microns in diameter, and not more than 1 particle that is larger than $n+5$ microns in diameter—0.00025 cc. thinned paint containing 0.00000029 cc. pigment, i. e., 2.9 times $10^{-7}$ cc. Such a mix-in pigment product is not obtained when prior grinding procedures are resorted to for effecting pigment comminution. Thus, when so tested, the untreated pigments exhibit a mix-in particle size value ranging in excess of about 25 to 30 microns and film particle size counts in excess of 750 and 900. In such condition they are wholly unfit for commercial coating composition use. When disintegrated or pulverized in prior grinding media, the product obtained is still deficient and non-useful for direct mix-in purposes. Thus, after such treatment the product exhibits mix-in particle size values in excess of substantially 25 microns, while in rare instances and after prolonged and special treatments, the pigments may exhibit a mix-in particle size value of about 18 microns. In every instance, however, the film particle size count value will range from above 150 to in excess of 200. In order to render such product useful in flat enamel or eggshell types of finishes, it must be further ground and for prolonged periods in the coating composition vehicle.

In the present invention, on the other hand, treatment of pigment or dyestuff-useful substances affords obtainment of a product which will meet all mix-in particle size and film particles count test requirements. The product thus becomes admirably suited for direct use and without any further grinding in the vehicle as a mix-in pigment. For instance, my novel pigments never exhibit a mix-in particle size value in excess of substantially 15 microns or a film particle count value in excess of substantially 60. Usually and preferably, my novel products exhibit mix-in pigment particle size values not exceeding substantially 6 microns with film particle size count values not in excess of substantially 30. While ordinarily my pigment product exhibits mix-in pigment particle size values below substantially 6 microns, it will be found, when its value is at, say, 6, 8 or 15 microns, less than 100 particles thereof will possess diameters in excess of these figures or sizes. For example, while a pigment having a mix-in particle size of about 6 microns may contain not to exceed about 25% pigment by weight having diameters in excess of 6 microns, it will usually contain less than about 5 to 10% by weight of such oversize material. Likewise, if an 8 micron pigment, it may contain as high as about 40% by weight over 8 micron diameter material, the amount of such oversize material being usually less than about 10% by weight of the total pigment. A 15 micron pigment may contain no particles having diameters less than 17 microns, but usually in excess of 50% by weight of the pigment is made up of particles having diameters less than 15 microns.

The following table more clearly demonstrates and comparably illustrates the mix-in values which certain types of pigments treated in accordance with my invention and in an apparatus of the type described in the examples, exhibit over the same types of pigment when treated in accordance with prior grinding procedures:

| | Pigment | Mix-in pigment particle size | Film particle count |
|---|---|---|---|
| (a) | TiO₂-CaSO₄ | | |
| | Untreated, unground calciner discharge | 35 | 900 |
| | Ground by prior art disintegrator | 22 | 800 |
| | Ground by prior art pulverizer | 19 | 210 |
| | Rotor-ground at 8,000 R. P. M | 8 | 40 |
| (b) | TiO₂ | | |
| | Untreated, unground calciner discharge | 29 | 755 |
| | Ground by prior art disintegrator | 19 | 150 |
| | Ground by prior art pulverizer | 18 | 80 |
| | Rotor-ground at 8,000 R. P. M | 4 | 5 |
| (c) | Lithopone | | |
| | Untreated, unground calciner discharge | 30 | 810 |
| | Ground by prior art disintegrator | 20 | 175 |
| | Rotor-ground at 8,000 R. P. M | 6 | 25 |
| (d) | TiO₂-BaSO₄ | | |
| | Untreated, unground calciner discharge | 25 | 800 |
| | Ground by prior art disintegrator | 21 | 765 |
| | Ground by prior art pulverizer | 18.5 | 200 |
| | Rotor-ground at 8,000 R. P. M | 3.5 | 26 |
| (e) | High ZnS lithopone (50% ZnS-50% BaSO₄) | | |
| | Untreated, unground calciner discharge | 25 | 765 |
| | Ground by prior art disintegrator | 23 | 295 |
| | Rotor-ground at 8,000 R. P. M | 5 | 28 |

Although the invention has been illustratively described in connection with certain preferred adaptations thereof wherein the particle size, texture, grit, oil absorption and mix-in characteristics of types of previously calcined prime white pigments have been improved, treatment of other types of pigments or dyestuff-useful substances and for the same purpose, as well as for comminuting the same to desired uniformity, is also contemplated. Thus, in addition to treating titanium oxide or zinc sulfide pigments per se, treatment of these prime pigments in combination with suitable extenders such as calcium and barium sulfates or carbonates, or with magnesium silicate, may be had. Or, if desired, independent treatment of the extenders or of other types of pigments, either alone or extended, may be resorted to. Specific instances of other types of pigments include the various metal titanates, zinc oxide, leaded zinc oxide, antimony oxide, white lead, alumina hydrate, etc. Similarly, various types of inorganic or organic colored pigments, alone or extended, such as ultramarine blue, zinc or chrome yellows, chrome greens, iron blues, earth colors such as iron oxides, carbon black, can also be treated in accordance with the invention and with beneficial effects, as may be the well-known organic types of pigments, including the azo pigment dyestuffs, such as para and toluidine reds, the precipitated azo pigments, such as lithol reds, etc., or even dry powdered paints. In addition, the invention may also be usefully employed in effecting desired reduction or comminution of other finely-divided substances, particularly insecticides, graphite, carbon, synthetic resins. The term "pigment-useful substances," as here employed and in the appended claims, is accordingly intended to include all such classes or types of materials.

It will also be obvious that suitable modification of the invention and the described apparatus may be resorted to without departing from its underlying spirit or scope. Thus, in the modification shown in Figs. 4 and 5 of the accompanying drawings, anvil members 15 and 15' are suitably provided with upstanding or depending flange members 16 and 16', whereby suitable fractionation and separation of the fines from the relatively coarse ground particles under treatment can be had and at the point or zone of greatest grinding or comminution which is occurring in the apparatus. In the modification shown in Fig. 4, the coarser material by reason of the projecting extremity of said flange member 16 is caused to be retained upon the surface 14' for further grinding and comminution, by reason of impact and attrition of the oncoming materials being discharged from the rotor outlet, whereas the fines portion of the material under treatment circuitously discharges from said receiving surfaces 14' through the restricted passage 18 and over the upper defining edges 17 of said flange member 16, and into the discharge or collecting zone 12'. In the instance of Fig. 5, in lieu of retaining the coarser material on the anvil receiving surface 14' for further comminution and grinding, said coarser material may be continuously or intermittently withdrawn from the apparatus through a suitable bleed or draw-off passage or conduit 19 into a suitable collecting receptacle 20, for either comminution or recycling to the inlet of the device for further treatment. As will be obvious in the modification shown in Figs. 4 and 5, only relatively superfine materials are caused to be discharged into the collecting chamber 12' and such classified finer material, due to its obviously finer state of subdivision, will be eminently suited for use as a mix-in product.

In addition to the foregoing modifications in apparatus, I may utilize in lieu of the described disc-like rotor element, a fan or rotor device which is substantially non-disclike in structure and provided with a plurality of radial apertured blade or extending arms, from which material for treatment may internally discharge from the peripheral extremities thereof. Similarly, the diameter of the rotor may be suitably varied, as may be the number, size and shape of the radially extending members 9 internally disposed within said rotor. Likewise, the surfaces of said radial members, as well as the surfaces of the internal passages 8, may be machined, corrugated or scored in any desired manner to induce and promote particle turbulence. Similarly, the impact or anvil member 13 may be made up of a plurality of separate, independent units, the material receiving surfaces of which may be machined to any suitable design or corrugated at right angles to the plane of rotation, in order to promote particle impingement, attrition and rubbing. Again, although in the embodiment illustrated, a single grinding unit has been employed, a plurality of such units may be utilized, if desired. In such instances these may be arranged to operate in series or parallel and in such manner that their respective rotor elements revolve at common or varied and unlike speeds. In such instances said rotors may be disposed in superposed relationship upon a common drive shaft and may be of the same or different diameters, in order that peripheral speeds and centrifugal action of each rotor may be alike or may vary, as desired. The rotor inlets may communicate with common or independent fluid and material feeding devices and independent or common discharge outlets or ducts may be associated with the chambers in which the impact anvil of each rotor is disposed, whereby material under treatment in said rotors may collectively discharge therefrom. Furthermore, in such instances and if desired, the material after treatment within one rotor may be introduced for further and successive treatment in one or more of the remaining associated rotors, thereby providing in a single operation continuous treatment of the material at and under varying conditions of rotor and peripheral speeds.

In addition, while I preferably employ air as a fluid medium for effecting suspension of material prior to introduction into the milling device for treatment, I may employ other types of fluids such as carbon dioxide, nitrogen, steam, etc. Also, while I preferably maintain the fluid or air employed at substantially atmospheric temperatures and pressures, use of such fluids at elevated temperatures or under pressure is also contemplated.

It will be evident from the foregoing that my improved type of milling device affords the obtainment of many advantages, inherent and otherwise, over prior types of milling media. Also, the products treated in accordance therewith exhibit a combination of properties which have not heretofore been capable of realization. It will be found that use of my improved type of milling apparatus constitutes a practical and economical means for producing pigment and dyestuff-useful materials in a satisfactorily fine state of sub-division, the fineness and texture characteristics of which will be far superior to the properties which products obtained in previously known forms of commercial grinding equipment present. Furthermore, the operating cost for unit weight of product will be found to be very much less when an apparatus such as that of my invention is utilized than in instances where other types of pulverizers employing fluid energy are resorted to, and this is especially true since it will not be necessary in the adaptation of my invention to employ expensive compressor installations.

I claim as my invention:

1. A process for improving the texture and fineness characteristics of pigment-useful substances, comprising subjecting said substances while fluid suspended to the attritive and grinding action of a rotor element operating at peripheral speeds ranging from substantially 20,000 to 60,000 ft./min., centrifugally discharging said substances for further grinding and attrition from internal passages within said rotor onto a receiving surface of an annular impact element concentrically disposed with respect to and completely surrounding the peripheral limits of said rotor, said receiving surface being maintained at a constant spaced distance from the peripheral limits of said rotor ranging from .1 to 1.0 inch, and during the treatment of said pigment substances maintaining a gaseous fluid flow through the treating apparatus ranging from about 200 cubic feet per minute to about 2000 cubic feet per minute, a pigment feed rate ranging from about 50 to 2000 pounds per hour and from about 0.0004 to about 0.17 pound of pigment material per cubic foot of gaseous fluid used.

2. A process for improving the texture and fineness characteristics of pigment-useful substances, comprising introducing regulated, predetermined quantities of such substances and while air suspended internally of a rotor element operating at a constant peripheral speed within the range of from 20,000 to 60,000 ft./min., centrifugally and violently discharging said substances after passage through said rotor and for further grinding and attrition onto the receiving surfaces of an annular impact element disposed in continuous, concentric relationship to the periphery of said rotor, said receiving surfaces being spacedly disposed in constant, spaced relationship, ranging from .1 to 1.0 inch from the points from whence said substances discharge from said rotor, and said impact element being adapted to separate coarser pigment particles from finer fractions and prolong retention of said coarser particles on said receiving surfaces to effect further grinding and comminution of the same.

3. A milling device for reducing the particle size of finely-divided materials, comprising a casing, a disc-shaped rotor element operatively disposed within said casing, a plurality of internal radial passages within said rotor the cross sectional area of which progressively increases from the substantial center of said rotor to terminate as material discharge outlets at the periphery thereof, separate means for passing material under treatment into and out of said casing, rotor and passages, means for receiving and further grinding material upon its centrifugal discharge from said rotor, comprising a stationary annular impart element in said outlet means disposed concentrically of and completely surrounding said rotor periphery, said impact element being provided with a material-receiving surface spacedly disposed equidistantly within a range of from about .1 to 1.0 inch from said rotor discharge outlets, means for imparting a peripheral rate of speed to said rotor ranging from 20,000 to 60,000 feet per minute, and a flange element integrally formed on said impact element, adapted to separate the coarser pigment particles from finer fractions and prolong retention of said coarser particles on said receiving surfaces for further grinding and comminution.

4. A process for improving the texture and fineness characteristics of pigment-useful substances, comprising subjecting said substances while fluid-suspended to the attritive and grinding action of a rotor element operating at a peripheral speed ranging from about 20,000 to 70,000 feet per minute, discharging said materials centrifugally and for further grinding and attrition from the interior of said rotor onto a receiving surface of an annular impact element concentrically disposed with respect to and substantially completely surrounding the peripheral limits of said rotor, maintaining said receiving surface at a substantially constant, spaced distance ranging from about .1 to 1.0" from the peripheral limits of said rotor, and during the treatment of said substances maintaining a gaseous fluid flow through the treating apparatus ranging from about 200 to 5000 cubic feet per minute and a substance feed rate ranging from about 50 to 4,000 pounds per hour.

5. A process for improving the texture and fineness characteristics of pigment-useful substances, comprising subjecting said substances while fluid-suspended to the attritive and grinding action of a rotor element operated at a peripheral speed of substantially 45,000 feet per minute, discharging said materials centrifugally and for further grinding and attrition from the interior of said rotor onto a receiving surface of an annular impact element disposed concentric with said rotor and substantially completely surrounding the peripheral limits thereof, maintaining said receiving surface at a substantially constant, spaced distance of about .5 of an inch from the peripheral limits of said rotor, and during the treatment of said pigment substances maintaining a gaseous fluid flow through the treating apparatus of about 1300 cubic feet per minute and a pigment feed rate of about 1500 pounds per hour.

6. A process for improving the texture and fineness characteristics of a calcium sulfate-extended titanium oxide pigment which comprises passing an air suspension of said pigment internally of a rotor element provided with a plurality of peripheral discharge outlets, maintaining rotor peripheral speeds ranging from substantially 20,000 to 60,000 feet per minute during passage of said pigment therethrough, centrifugally discharging said pigment from the internal passages of said rotor onto the receiving surface of an annular impact element concentrically disposed with respect to and completely surrounding the peripheral limits of said rotor, said receiving surface being in constant, spaced relationship and within a distance ranging from .1 to 1" from the peripheral outlets from whence said pigment discharges from said rotor and during the treatment of said pigment maintaining a gaseous fluid flow through the treating apparatus ranging from about 200 to 2000 cubic feet per minute and a pigment feed rate ranging from about 50 to 2000 pounds per hour.

7. A milling device for reducing the particle size of finely-divided substances, comprising a casing, a rotor element operatively disposed within said casing and provided with internal passages which terminate at the periphery of said rotor as discharge outlets therefor, means for introducing material for treatment into said casing and rotor element, means comprising a stationary, annular impact element disposed concentric to said rotor and provided with a material-receiving surface disposed at a distance ranging from about .1 to 1.0" from the discharge outlets of said rotor, means for imparting a peripheral rate of speed to said rotor ranging from about 20,000 to 70,000 feet per minute, and a fractionating member associated with the receiving surfaces of said impact element adapted to separate the coarser pigment particles from the finer fractions and prolong retention of said coarser particles on said receiving surfaces for further grinding and comminution.

8. A milling device for reducing the particle size of finely-divided substances, comprising a casing, a rotor element operatively disposed within said casing and provided with internal passages which terminate at the periphery of said rotor as discharge outlets therefor, means for introducing material for treatment into said casing and rotor element, means comprising a stationary, annular impact element disposed concentric to said rotor and provided with a material-receiving surface disposed at a distance ranging from about .1 to 1.0" from the discharge outlets of said rotor, means for imparting a peripheral rate of speed to said rotor ranging from about 20,000 to 70,000 feet per minute, a fractionating member integrally formed on said impact element adapted to separate the coarser pigment particles from the finer fractions thereof, and means for radially withdrawing said separated coarser fractions from said impact element.

CHARLES EDWARD BERRY.